US012308132B2

(12) United States Patent
Escoffier et al.

(10) Patent No.: US 12,308,132 B2
(45) Date of Patent: May 20, 2025

(54) RECOVERY TOOL FOR RECOVERING A SOLID ELEMENT, IN PARTICULAR A RADIOACTIVE MATERIAL, COMPRISING A CAPTURE HEAD AND A CUP

(71) Applicant: ORANO DS—DÉMANTÈLEMENT ET SERVICES, Gif sur Yvette (FR)

(72) Inventors: Cédric Escoffier, Bagnols-sur-Ceze (FR); François Catsivelas, Violes (FR); Sébastien Bouzat, Saint Privat des Vieux (FR)

(73) Assignee: ORANO DS13 DÉMANTÈLEMENT ET SERVICES, Gif sur Yvette (FR)

(*) Notice: Subject to any disclaimer, the term of this patent is extended or adjusted under 35 U.S.C. 154(b) by 570 days.

(21) Appl. No.: 17/597,252

(22) PCT Filed: Jun. 30, 2020

(86) PCT No.: PCT/FR2020/051142
§ 371 (c)(1),
(2) Date: Dec. 30, 2021

(87) PCT Pub. No.: WO2021/001624
PCT Pub. Date: Jan. 7, 2021

(65) Prior Publication Data

US 2022/0319725 A1 Oct. 6, 2022

(30) Foreign Application Priority Data

Jul. 3, 2019 (FR) ...................................... 1907380

(51) Int. Cl.
*G21F 7/06* (2006.01)

(52) U.S. Cl.
CPC .................................. *G21F 7/067* (2013.01)

(58) Field of Classification Search
CPC ...... Y10S 294/906; G21C 19/32; G21F 7/067
USPC ........................................................ 414/146
See application file for complete search history.

(56) References Cited

U.S. PATENT DOCUMENTS

| | | | | |
|---|---|---|---|---|
| 4,192,646 | A * | 3/1980 | Berg | F27D 3/06 432/239 |
| 10,458,966 | B2 * | 10/2019 | Leslie | B25J 11/0045 |
| 2021/0142924 | A1 | 5/2021 | Escoffier | |

FOREIGN PATENT DOCUMENTS

| | | | |
|---|---|---|---|
| CN | 207566817 | U | 7/2018 |
| JP | 09-123080 | A | 5/1997 |
| JP | 2010-005736 | A | 1/2010 |
| JP | 2014-200874 | A | 10/2014 |

(Continued)

*Primary Examiner* — Saul Rodriguez
*Assistant Examiner* — Willie W Berry, Jr.
(74) *Attorney, Agent, or Firm* — McDonald Hopkins LLC

(57) ABSTRACT

A recovery tool for recovering a solid element, in particular a radioactive material. The recovery tool includes a chassis, a capture head and at least one cup. The capture head is movable with respect to the chassis between a retracted position and a deployed position. In the retracted position, the capture head is accommodated within a chamber of the recovery tool. In the deployed position, the capture head is able to capture the solid element. The cup is movable with respect to the chassis between an open position and a closed position. In the open position, the cup allows the capture head to be deployed. In the closed position of the cup, the cup allows the solid element to be retained within the chamber with the capture head in the retracted position.

17 Claims, 5 Drawing Sheets

(56) References Cited

FOREIGN PATENT DOCUMENTS

| | | | |
|---|---|---|---|
| JP | 2014235009 | A | 12/2014 |
| JP | 2019011988 | A | 1/2019 |
| WO | 2020233963 | A1 | 11/2020 |

* cited by examiner

RECOVERY TOOL FOR RECOVERING A SOLID ELEMENT, IN PARTICULAR A RADIOACTIVE MATERIAL, COMPRISING A CAPTURE HEAD AND A CUP

CROSS-REFERENCE TO RELATED APPLICATIONS

This is a National Stage of PCT international application PCT/FR2020/051142, filed on Jun. 30, 2020, which claims the priority of French Patent Application No. 1907380, filed Jul. 3, 2019, both of which are incorporated herein by reference in their entirety.

TECHNICAL FIELD

The invention relates to a tool for recovering a solid element which is not directly accessible to man, which is difficult to grip by conventional gripping means, and which makes it possible to ensure its "unlosability" after recovery. It is especially applicable to dense and/or radioactive solid elements, such as a corium fragment.

Background of the Invention

In the context of operation, dismantling or sanitation projects in nuclear environment, it may be necessary to capture and radiologically isolate highly radioactive elements or materials with varying size, density and mass, such as corium fragments.

The capture of such solid elements or radioactive materials is likely to be carried out in zones that are inaccessible or difficult to access by a human being, while seeking to limit radiation exposure of a human operator, mass and overall size of the recovery tool. The capture and isolation of solid elements or radioactive materials is difficult to implement given these restrictions.

Due to the geometry or surface condition of the solid element, it is difficult to grip using prior art tools such as tongs or suction buckets. Furthermore, once captured, the solid element must not fall or be lost during subsequent operations, such as transport to a measurement or analysis device.

DISCLOSURE OF THE INVENTION

The invention aims at solving at least partially the problems encountered in the solutions of prior art.

In this respect, one object of the invention is a tool for recovering a solid element, especially a radioactive material. The recovery tool comprises a chassis, a capture head and at least one bucket.

The capture head is movable relative to the chassis between a retracted position and an extended position to capture the solid element. In the retracted position, the capture head is housed inside an enclosure of the recovery tool.

The bucket is movable relative to the chassis between an opening position and a closing position. In the opening position, the capture head is extended. In the extended position of the capture head, the bucket is in the opening position.

In the closing position, the capture head is in a retracted position to retain the solid element inside the enclosure. In the retracted position of the capture head, the bucket is in the closing position.

The capture head comprises a fluid-inflatable cushion. The capture head is configured to retain the solid element relative to the chassis at least partially by suction by emptying fluid from the inflatable cushion, especially when the capture head is in the extended position.

By virtue of the recovery tool according to the invention, it is possible to capture a solid element, especially a radioactive material such as a corium fragment, to retain the solid element inside the recovery tool, while protecting an operator from radiation. The depression created in the capture head allows the solid element to be captured more effectively. The recovery tool is relatively not heavy and of low overall size. It is decontaminatable, reliable and easy to use. It can be controlled remotely, especially by remote operation.

The capture head is able to capture the solid element more effectively because of the cushion. The cushion is deformable to capture the solid element by adapting to its shape without damaging it. The inflatable cushion allows the solid element to be captured even more effectively by suction of at least some of the fluid into the inflatable cushion.

The invention may optionally include one or more of the following characteristics in combination with each other or alone.

In particular, the enclosure is at least partially closed by the bucket in the closing position. In particular, the cushion is located outside the chassis when the capture head is in the extended position.

Preferably, the cushion is made of a material comprising an elastomer such as a silicone or latex.

Preferably, the capture head comprises a filter for the fluid.

Preferably, the fluid is air.

According to one feature, the capture head is removably connected to the chassis of the recovery tool.

Preferably, the capture head is removably connected to the chassis of the recovery tool by screwing.

The capture head can be easily replaced. In particular, the recovery tool may be equipped with interchangeable capture heads, for example a capture head particularly adapted to the solid element to be captured.

According to one feature, the movable bucket is a first bucket. The recovery tool comprises a second bucket which is movable between an opening position for extension of the capture head, and a closing position in which the capture head is in a retracted position to retain the solid element inside the enclosure.

In the opening position of each bucket, the capture head is extended. In the extended position of the capture head, each bucket is in the opening position.

In the closing position of each bucket, the capture head is in the retracted position to retain the solid element inside the enclosure. In the retracted position of the capture head, each bucket is in the closing position.

Preferably, the second bucket is substantially identical in structure to the first bucket.

Highly preferably, the second bucket is configured to have a position symmetrical to the position of the first bucket with respect to a plane of symmetry passing through the capture head, when opening and/or closing the buckets.

According to one feature, each bucket is configured to remain in the closing position when the solid element impacts this bucket when the capture head is in the retracted position, especially in the event of a fall due to the accidental loss of holding of the solid element by the capture head.

According to one feature, each bucket is rotatably movable relative to the chassis between its opening position and its closing position.

Preferably, each bucket is rotatably movable relative to the chassis as it is moved from its opening position to its closing position.

According to one feature, each bucket is rigidly integral with an arm which is movably connected to a movable body of the recovery tool.

Each bucket then tends to move further away from the capture head as the capture head extends, thereby facilitating capture of the solid element.

According to one feature, the recovery tool comprises an elastic return member that is configured to elastically bias the capture head towards the retracted position.

Preferably, the elastic return member comprises a tension spring.

Highly preferably, the tension spring is a coil spring.

The elastic return member biases the capture head inwardly of the enclosure to retain the solid element inside the recovery tool, in the absence of external control to the recovery tool, especially in the event of a failure of the control system for the recovery tool. By virtue of the elastic return member, the retracted position of the capture head and the closing position of the at least one bucket are a safety position of the recovery tool.

Preferably, the chassis comprises a casing, the recovery tool comprises a movable body which is distinct from the capture head and which is translationally movable relative to the chassis.

According to one feature, the movable body comprises a mount and at least two legs each projecting from the mount. Each leg is configured to mechanically engage a bucket arm to move that bucket relative to the chassis.

Each bucket then tends to move further away from the capture head as the capture head extends, thereby facilitating capture of the solid element.

Preferably, each leg is configured to mechanically engage a bucket arm to move this bucket relative to the chassis, by mechanically engaging a rack and a toothed wheel.

According to one feature, the recovery tool comprises a device for guiding the movable body relative to the chassis.

Preferably, the recovery tool comprises a device for translationally guiding the movable body relative to the chassis.

Preferably, the guide device comprises a groove that is configured to mechanically engage a pin that is housed in the groove.

The recovery tool comprises a linear actuator to move the capture head relative to the chassis between the retracted position and the extended position.

Preferably, the linear actuator comprises a cylinder.

Preferably, the linear actuator comprises a pneumatic actuator.

Due to the linear actuator, the operation of the recovery tool can be more easily automated and the recovery tool can be remotely controlled by an operator, to protect the operator from radiation when the solid element is a radioactive material.

According to one feature, the recovery tool comprises an inflator which is fluidly connected to the capture head to inflate it by at least partially filling it with fluid and/or to deflate it by at least partially emptying it of fluid.

The invention is also concerned with an apparatus for recovering a solid element, comprising a recovery tool as defined above.

According to one feature, the recovery apparatus further comprises a control system for the recovery tool and/or a holding member for the recovery tool.

According to one feature, the recovery apparatus comprises a recovery monitoring device for monitoring the recovery of the solid element by the recovery tool.

Preferably, the recovery monitoring device comprises an image capture device.

Highly preferably, the image capture device is housed inside the enclosure at least when the bucket is in the closing position.

Capture of the solid element, especially the radioactive material, is facilitated by the monitoring device.

The invention is also directed to a method for recovering a solid element, especially a radioactive material, by means of a recovery tool as defined above or a recovery apparatus as defined above.

According to the invention, the recovery method comprises a step of capturing the solid element, which comprises depressurising the capture head to retain the solid element relative to the capture head, moving the capture head from its extended position to its retracted position, and closing the at least one bucket, to retain the solid element inside the enclosure of the recovery tool.

By virtue of the recovery method according to the invention, it is possible to capture a solid element, especially a radioactive material such as a corium fragment, to retain the solid element inside the recovery tool, while protecting an operator from radiation.

According to one feature, the recovery method comprises a step of opening the at least one bucket and extending the capture head, especially facing the solid element, before the step of capturing said element.

Preferably, the step of opening the at least one bucket and extending the capture head comprises inflating the capture head by filling it at least partially with fluid.

According to one feature, the capture step comprises pressing the capture head onto the solid element to capture it.

By pressing the capture head onto the solid element, the capture thereof is facilitated.

Preferably, the capture step comprises depressurising the capture head by at least partially emptying it of fluid.

BRIEF DESCRIPTION OF THE DRAWINGS

The present invention will be better understood upon reading the description of an exemplary embodiment, given purely by way of indicating and in no way limiting purposes, with reference to the appended drawings in which.

DETAILED DISCLOSURE OF PARTICULAR EMBODIMENTS

Figure 1:
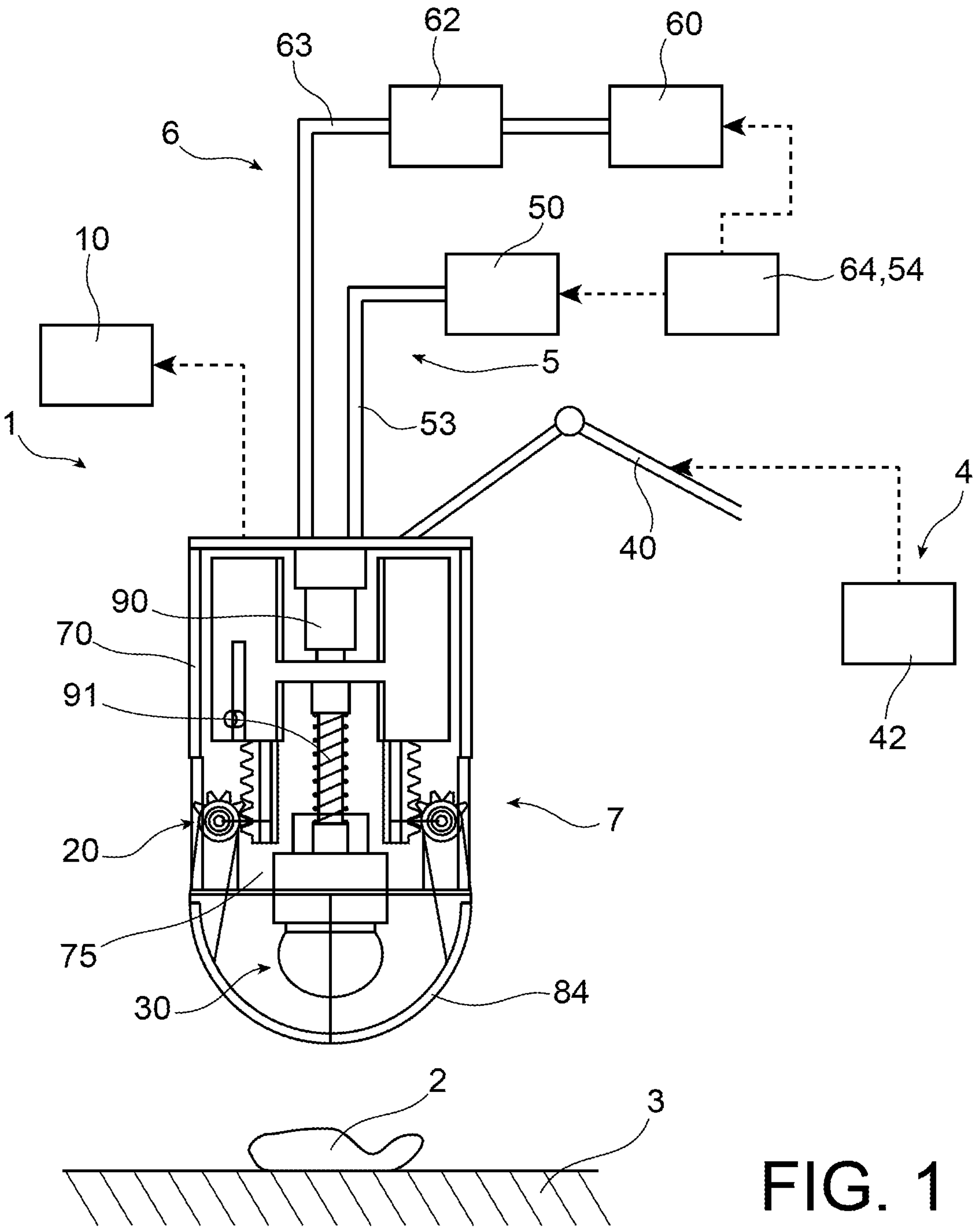
FIG. 1 is a partially perspective schematic representation of an apparatus for recovering a solid element, in this case a radioactive material.

Identical, similar or equivalent parts of the various figures bear the same reference numerals so as to facilitate switching from one figure to another.

FIG. 1 represents an apparatus 1 for recovering a solid element 2, according to a first embodiment. The solid element 2 is potentially dense, with variable dimensions and mass, which makes it all the more difficult to recover. It is, for example, a radioactive material and in particular a corium fragment.

This radioactive material 2 is bearing on a base 3 which may be in the open air, in a confined enclosure, or even submerged. The radioactive material 2 may be at a place that is difficult to access and/or particularly dangerous for a human operator.

The recovery apparatus 1 comprises a recovery tool 7, a holding member 40 for the recovery tool, an actuation system for the recovery tool 7, at least one control system 4 and a recovery monitoring device 10.

The holding member 40 comprises an articulated arm in the example represented. It is configured to support and move the recovery tool 7 to capture the radioactive material 2 and transport it prior to its radiological isolation, for example in a container.

The control system 4 of the apparatus comprises a control system 42 for the holding member 40. The control system 42 for the holding member comprises, for example, at least one computer. It is configured to control the holding member 40 to move the recovery tool 7 remotely, especially by remote operation.

The recovery tool 7 comprises a capture head 30.

The system for actuating the recovery tool 7 comprises an extension system 5 and an inflation system 6 for the capture head 30.

The extension system 5 for the capture head includes a pressurisation member, an actuation conduit 53 and an extension control system 54. It is configured to allow extension of the capture head 30 relative to a chassis 70 of the recovery tool 7, to capture the radioactive material 2.

The pressurisation member comprises at least one compressor 50 in the embodiment represented. The actuation conduit 53 fluidly connects the pressurisation member to a linear actuator 90, which is of pneumatic type in the embodiment represented. The actuation conduit 53 comprises, for example, at least one flexible pipe. The actuation conduit 53 is used to supply the actuator 90 with pressurised fluid.

The extension control system 54 is used to control operation of the pressurisation member. It comprises, for example, at least one computer.

In the embodiment represented, the fluid is air. The extension system 5 and the inflation system 6 are configured to inject pressurised air into the recovery tool 7.

The inflation system 6 for the capture head comprises a pumping member, a fluid supply conduit 63, a pressure monitoring device 62 and a pneumatic control system 64.

The pumping member comprises at least one pump 60, for example a peristaltic type pump in the embodiment represented. The supply conduit 63 fluidly connects the pumping member to an inflator 96 which is visible in FIG. 2 and which is of the pneumatic type in the embodiment represented. The supply conduit 63 comprises, for example, at least one flexible pipe. It is used to supply the inflator 96 with pressurised fluid or to depressurise the inflator 96.

The pressure monitoring device 62 comprises at least one pressure gauge which is configured to monitor the pressure of the fluid injected by the pumping member to the recovery tool 7.

The pneumatic control system 64 is used to control the operation of the pumping member, to at least partially fill and/or empty the capture head 30 with/of fluid. It comprises, for example, at least one computer. The pneumatic control system 64 and the extension control system 54 form a single fluidic control system in the embodiment represented. This fluidic control system is especially part of the control system 4.

In the embodiment represented, the recovery tool 7 is reusable. In other words, it can be utilised to successively recover several radioactive materials 2. It has an ogive shape when closed, exhibiting an outer surface revolving about a longitudinal axis Z-Z of the recovery tool 7.

With joint reference to FIGS. 1 to 4, the recovery tool 7 comprises a chassis 70, a movable assembly 8, a guide device 44, a linear actuator 90, an elastic return member 91, an inflator 96, a capture head 30 and the recovery monitoring device 10.

The capture head 30 is movable relative to the chassis 70 between a retracted position and an extended position. Each bucket 84 of the movable assembly 8 is movable relative to the chassis 70 between an opening position and a closing position. The recovery tool 7 has a closed position in which the capture head 30 is in a retracted position and each bucket 84 is in a closing position, and an open position in which the capture head 30 is in an extended position and each bucket 84 is in an opening position.

The chassis 70 of the recovery tool 7 comprises a casing 71 and a bottom 72.

The casing 71 is annular shaped about the longitudinal axis Z-Z. It is open at its lower end and at its upper end along the longitudinal axis Z-Z. It is in one piece.

The bottom 72 seals the upper end of the casing 71 to which it is attached, for example by screwing. A first port 73*a* which is a passage hole of the actuation conduit 53, and a second port 73*b* which is a passage hole of the supply conduit 63 pass through the bottom 72.

The chassis 70 and the buckets 84 of the recovery tool 7 delimit an enclosure 75 inside the recovery tool 7, to house the capture head 30 when the capture head 30 is in the retracted position.

The movable assembly 8 of the recovery tool 7 comprises an inner movable body 80, two arms 82, two buckets 84, a bucket drive device 20 and a guide device 44. It is movable relative to the chassis 70 to allow extension and retraction of the capture head 30.

The movable body 80 comprises a sliding portion 81, a mount 83 and at least two legs 85, each projecting from the mount 83 towards the capture head 30. It is especially in one piece.

Figure 3:
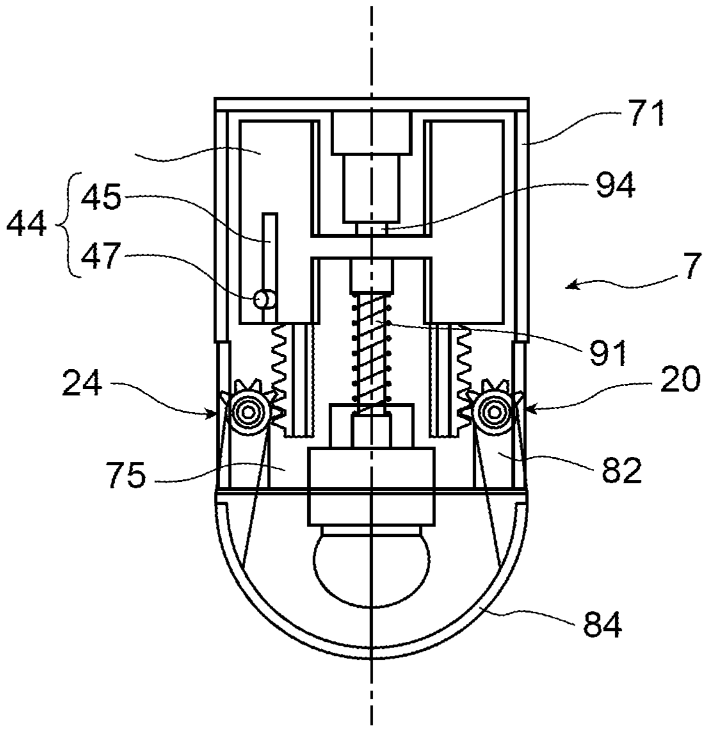
FIG. 3 is a partially perspective schematic representation of the recovery tool, in which the buckets are in the closing position.
Figure 4:
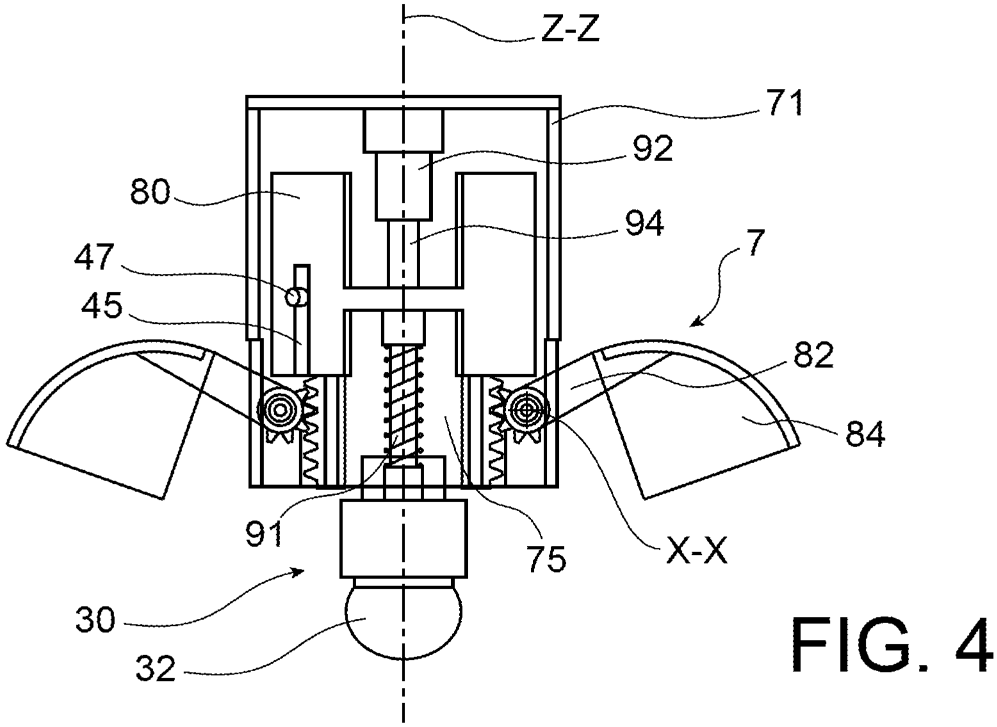
FIG. 4 is a partially perspective schematic representation of the recovery tool, in which the buckets are in the opening position.

In the embodiment represented, the movable body 80 is translationally movable relative to the chassis 70 along the longitudinal axis Z-Z of the recovery tool 7 between an up position, which is represented in FIG. 3, and a down position, which is represented in FIG. 4, so that the recovery tool 7 transitions from its closed position to its open position and vice versa. The up position of the movable body 80 corresponds to the closed position of the recovery tool 7. The down position of the movable body 80 corresponds to the open position of the recovery tool 7.

More generally, the movable body 80 is configured to be movable relative to the chassis 70 with a translational component along the direction of actuation Z-Z, to transition the recovery tool 7 from its closed position to its open position and vice versa.

A direction parallel to the direction of the longitudinal axis Z-Z of the recovery tool 7 is also referred to as the direction of actuation unless otherwise specified in the following disclosure. A circumferential direction is a direction around the direction of actuation. A transverse direction is a direction orthogonal to the direction of actuation Z-Z.

The sliding portion 81 extends from the mount 83 opposite the legs 85 along the direction of the longitudinal axis Z-Z of the recovery tool 7. The sliding portion 81 comprises a wall which has an annular shape about the longitudinal axis Z-Z. It bears on the bottom 72 when the buckets 84 and the capture head 30 are in the closing position. It is configured to slide against the casing 71 that surrounds it, along the direction of actuation Z-Z.

The mount 83 has a symmetrical plate shape about the longitudinal axis Z-Z of the recovery tool 7. It is mechanically connected on the one hand to the linear actuator 90 and on the other hand to the elastic return member 91, which are designed to bias it in a direction parallel to the longitudinal axis Z-Z in opposite senses.

Each leg 85 projects from the mount along the direction of the longitudinal axis Z-Z towards the capture head 30. The legs 85 are laterally spaced from each other along a transverse direction of the recovery tool 7. Each leg 85 comprises a first toothing 23. In the embodiment represented, each leg 85 includes a rack 22 near its lower end along the direction of actuation Z-Z, which carries the first toothing 23.

With reference more specifically to FIGS. 3 and 4, the guide device 44 comprises a groove 45 and a pin 47 which is housed in the groove 45. It is configured to guide movement of the movable body 80 relative to the chassis 70. In the embodiment represented, the guide device 44 is configured to translationally guide the movable body 80 relative to the chassis 70.

The pin 47 is rigidly integral with the casing 71 from which it projects inwardly of the chassis 70, especially radially relative to the longitudinal axis Z-Z. The pin 47 is configured to mechanically engage the groove 45 and to move in the groove 45 when the recovery tool 7 transitions from its closed position to its open position and vice versa.

The groove 45 is made in the sliding portion 81. It passes through the sliding portion 81. It has an elongated shape along the direction of the longitudinal axis Z-Z.

The movable assembly 8 comprises at least one arm 82 per bucket 84. In the embodiment represented, each bucket 84 is rigidly integral with a single arm 82. Each arm 82 extends from a proximal end at which it is connected to the movable body 80 to a distal end at which it is connected to one of the buckets 84.

Each arm 82 is connected by a toothed wheel 24 to the rack 22 of the corresponding leg 85 of the movable body 80. Each arm 82 is rotatably movable about an axis of rotation X1-X1, respectively X2-X2, which passes through the centre of the toothed wheel 24 relative to the chassis 70. The arm 82 is also movable with a translational component along the direction of actuation Z-Z with respect to the movable body 80, when the recovery tool 7 transitions from the open position to the closed position and vice versa.

Each toothed wheel 24 comprises a second toothing 25 that is configured to mechanically engage the first toothing 23 of the corresponding rack 22, to move the corresponding arm 82 relative to the movable body 80 and relative to the chassis 70.

The toothed wheels 24, the racks 22 and the arms 82 together form a drive device 20 for each of the buckets 84 relative to the chassis 70 between their opening and closing positions and vice versa.

The movable assembly 8 comprises a first bucket 84 and a second bucket 84 which is substantially identical in structure to the first bucket 84. The second bucket 84 is configured to have a position symmetrical to the position of the first bucket 84 with respect to a plane of symmetry passing through the capture head 30, when opening or closing the buckets 84. The buckets 84 are designed to seal the enclosure 75 in the closing position and optionally retain the radioactive material 2 in the enclosure 75, in the closing position.

In the embodiment represented, each bucket 84 is rigidly integral with one of the arms 82, being formed as a single piece with the corresponding arm 82. Each bucket 84 is a trough having a generally quarter sphere shape.

Each bucket 84 is rotatably movable about an axis of rotation X1-X1, respectively X2-X2, which passes through the centre of one of the toothed wheels 24 relative to the chassis 70 when moved from its opening position to its closing position and vice versa. More generally, the stroke of each bucket 84 relative to the chassis 70 includes a rotational component.

In the opening position, each bucket 84 is configured to allow extension of the capture head 30. Each bucket 84 is laterally remote from the capture head 30 and the other of the buckets 84, relative to the closing position.

In the closing position, each bucket 84 seals the enclosure 75 and the capture head 30 is in the retracted position, to retain the radioactive material 2 inside the enclosure 75. The buckets 84 are then joined along a junction line J-J which is substantially transversally in the centre of the recovery tool 7.

In particular, each bucket 84 is configured to remain in the closing position when the radioactive material 2 falls from the capture head 30 onto that bucket 84.

The linear actuator 90 is a pneumatic actuator. The linear actuator 90 comprises a housing 92 and a rod 94 which is translationally movable along the direction of actuation Z-Z relative to the housing 92. The linear actuator 90 thereby forms a cylinder. In the embodiment represented, the linear actuator 90 is supplied with pressurised air from the compressor 50 and forms a pneumatic cylinder.

The linear actuator 90 is configured to move the capture head 30 relative to the chassis 70 between the retracted position and the extended position via the movable body 80 and the drive device 20.

The housing 92 is rigidly integral with the chassis 70, for example being attached to the bottom 72. The housing 92 has an annular shape, typically cylindrical with a circular cross-section about the longitudinal axis Z-Z of the recovery tool 7 in the example represented.

The rod 94 extends longitudinally along the direction of actuation Z-Z. It is mechanically connected at its lower end to the mount 83 of the movable body 80, which it translationally biases downwardly along the direction of actuation Z-Z to extend the capture head 30. It forms a piston.

The elastic return member 91 comprises a tension spring, especially a coil spring. It extends longitudinally along the direction of actuation Z-Z from the mount 83 of the movable body 80 to the capture head 30. The elastic return member 91 is configured to elastically bias the capture head 30 towards the retracted position and the movable body 80 towards the up position.

The elastic return member 91 is configured to automatically bias the capture head 30 towards the retracted position, in the absence of external control from the recovery tool 7, that is especially in the absence of pneumatic control from the extension control system 54 via the compressor 50.

In particular, it is configured to automatically bias the capture head 30 inwardly of the enclosure 75 as soon as the capture head 30 has captured the radioactive material 2, to isolate the radioactive material 2 inside the enclosure 75.

It is also configured to automatically bias the capture head 30 inwardly of the enclosure 75 to retain the radioactive material 2 inside the enclosure 75, in the event of a failure of the control system 4 once the radioactive material 2 has been captured.

The inflator 96 comprises a tip 98 and an inner pressurisation and depressurisation conduit 99. The inflator 96 is rigidly integral with the capture head 30, especially being fixed to a base plate 36 of the capture head. It is fluidly connected to the capture head 30, to inflate it by filling it at least partially with air and/or to deflate it by emptying it at least partially of air.

The tip 98 of the inflator 96 is fluidly connected to the supply conduit 63 and opens into the inner conduit 99 which is located inside the inflator 96, being substantially annular about the direction of actuation Z-Z. The inner conduit 99 is fluidly connected to an air supply channel 37 of the capture head 30.

Figure 2:
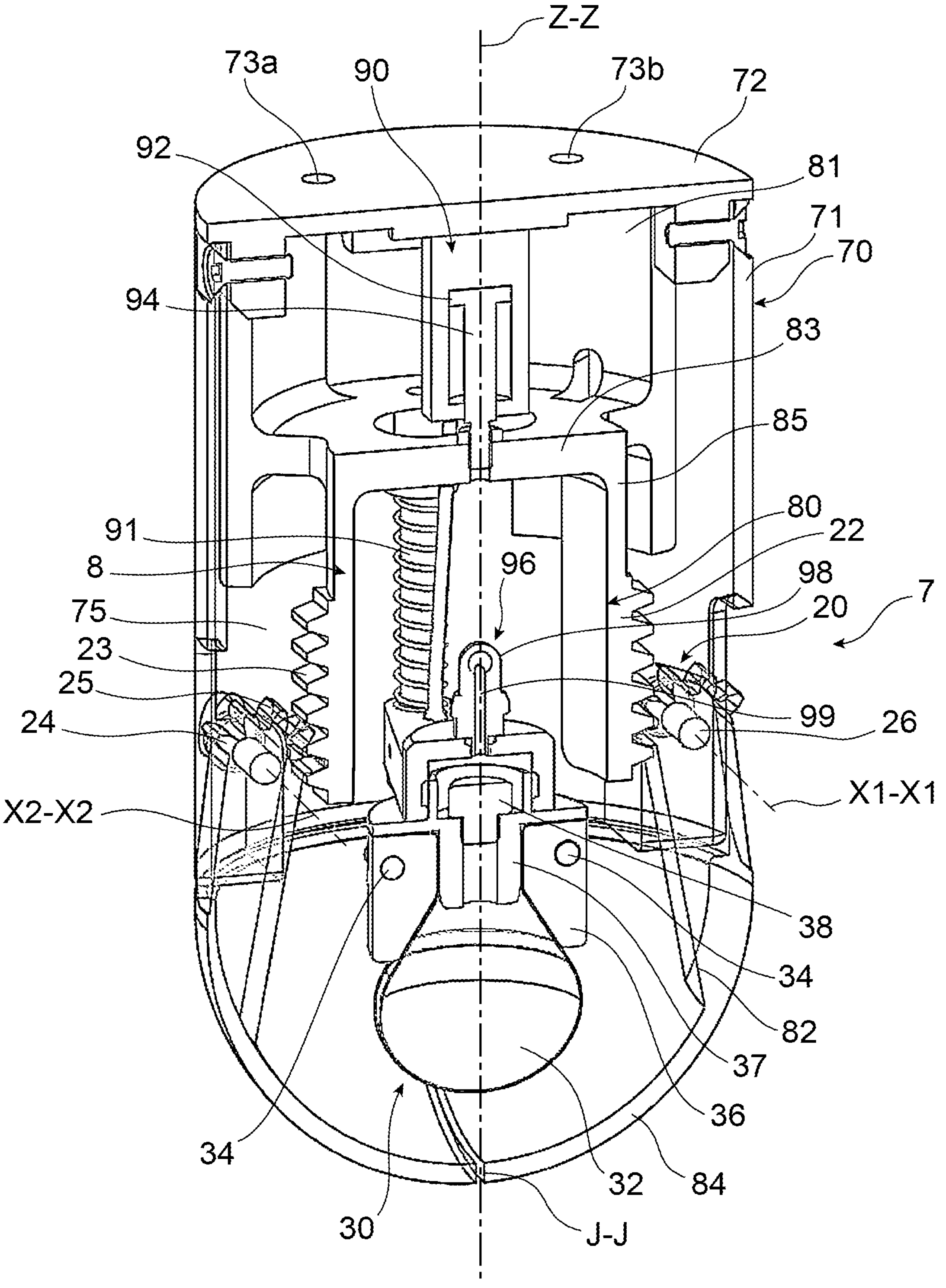
FIG. 2 is a schematic longitudinal cross-section representation of a tool for recovering a solid element, in this case a radioactive material

With joint reference to FIGS. 2 to 4, the capture head 30 comprises a cushion 32, a base plate 36, a connection device for the capture head and a filtration device 38. The capture head 30 is carried by the lower end of the elastic return member 91 relative to the chassis 70.

The capture head 30 is translationally movable along the direction of actuation Z-Z relative to the chassis 70 between an up position in which it is in the retracted position and a down position in which it is in the extended position. It is configured to capture the radioactive material 2 and to retain it in the enclosure 75 until it is transported out of the recovery tool 7, for example into a container.

In the retracted position, the capture head 30 is housed inside the enclosure 75 of the recovery tool 7. It is in an up position relative to the chassis 70 in the direction of actuation Z-Z. The cushion 32 is partially deflated.

In the extended position, at least the cushion 32 of the capture head 30 is located outside the casing 71. The capture head 30 is in the down position relative to the chassis 70 along the direction of actuation Z-Z. The cushion 32 is at least partially inflated. The capture head 30 is able to capture the radioactive material 2.

The cushion 32 is made of a material comprising an elastomer such as a silicone or latex. The material of the cushion 32 has dimensions and deformability that are adapted to the radioactive material 2 to be captured. It is sufficiently deformable to press onto the radioactive material 2 if necessary without damaging it, while being sufficiently rigid to retain the radioactive material 2 when the capture head 30 is moved.

In the embodiment represented, the cushion 32 is able to be inflated and/or deflated by the inflator 96. The capture head 30 is configured to retain the radioactive material 2 at least partially by suction relative to the chassis 70, by partially emptying the capture head 30.

In the example represented, the base plate 36 has a shape revolving about the direction of the longitudinal axis Z-Z of the recovery tool 7. It has especially generally a cylindrical shape with a circular cross-section. A supply channel 37 passes therethrough. It is mechanically connected to the elastic return member 91 and is fluidly connected to the inflator 96 attached to the base plate 36.

The supply channel 37 extends between the inner conduit 99 of the inflator to an inner cavity of the cushion 32. The supply channel 37 opens into the inner cavity of the cushion 32, to inflate and/or deflate it by filling and/or emptying it at least partially with/of fluid.

The capture head 30 comprises a filtration device 38 which is fluidly located between the inner conduit 99 of the inflator and the supply channel 37 of the capture head. The filtration device 38 comprises a filter which is located at the inlet of the supply channel 37. The filtration device 38 is used to filter the fluid entering and/or leaving the cushion 32.

The capture head 30 is removably connected to the chassis 70, by at least one fastener. In the embodiment represented, the base plate 36 is connected by screws 34 to the lower end of the elastic return member 91. The screws 34 form a device for connecting the capture head 30.

The recovery monitoring device 10 comprises an image capture device (not represented) such as a camera. The recovery monitoring device 10 is configured to monitor recovery of the radioactive material 2 by the recovery tool 7, thereby facilitating capture of the radioactive material 2.

The image capture device is housed inside the enclosure 75, at least when the bucket 84 is in the closing position. In the embodiment represented, the image capture device is for example attached to the base plate 36 of the capture head.

In FIG. 3, the recovery tool 7 is in the closed position. The capture head 30 is in the retracted position, being inside the enclosure 75. Each of the buckets 84 is in the closing position, to seal the lower end of the enclosure 75. The rod 94 of the linear actuator 90 is in the retracted position. The movable body 80 is in an up position relative to the chassis 70. The pin 47 is in a lower portion of the groove 45 in the direction of actuation Z-Z. Each toothed wheel 24 engages the corresponding rack 22 in a lower portion of the rack 22.

In FIG. 4, the recovery tool 7 is in the open position. The capture head 30 is in the extended position, being outside the enclosure 75. Each of the buckets 84 is in the opening position, to allow extension the capture head 30, that is the outlet of the capture head 30. The rod 94 of the linear actuator 90 is in the extended position. The movable body 80 is in a down position relative to the chassis 70. The pin 47 is in an upper portion of the groove 45 along the direction of actuation Z-Z. Each toothed wheel 24 engages the corresponding rack 22 in an upper portion of the rack 22.

The method 100 for recovering the radioactive material is illustrated with joint reference to FIGS. 5A to 5D. The recovery method 100 is implemented by means of the recovery apparatus 1.

Figure 5A:
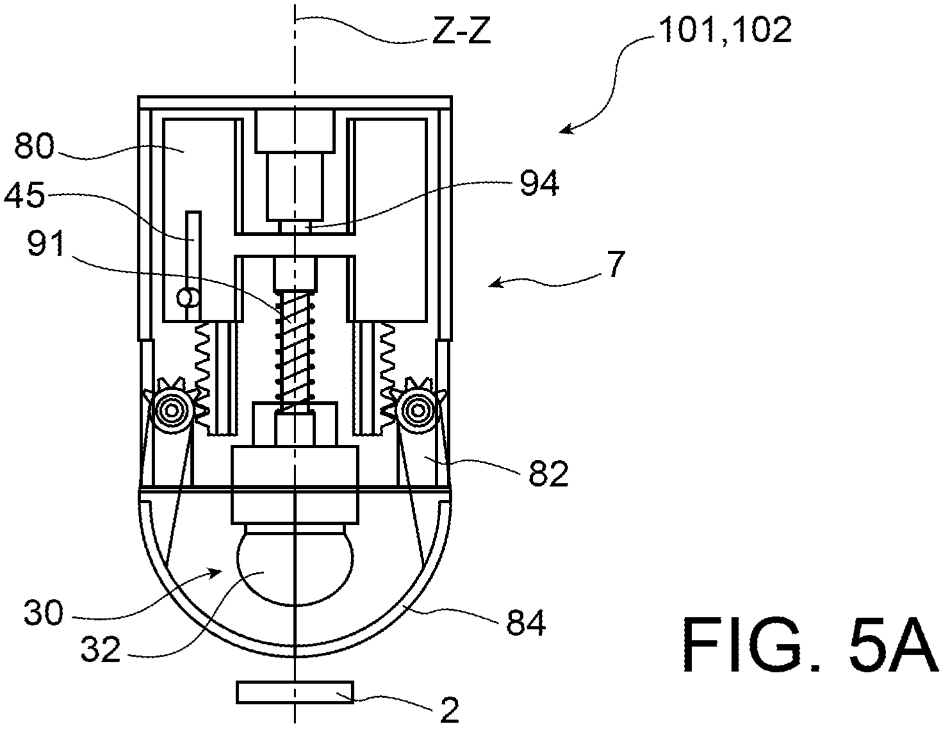
FIGS. 5A, 5B, 5C, 5D illustrate a method for recovering a solid element, in this case a radioactive material, using the recovery tool.

With reference to FIG. 5A, the recovery method 100 starts with a step of moving 101 the recovery tool, via the articulated arm and the control system 42 of the holding member 40, to bring the recovery tool 7 closer to the radioactive material, and then to align the capture head 30 with the radioactive material 2 along the direction of actuation Z-Z during a step of bringing 102 the recovery tool 7 facing the radioactive material 2.

Figure 5B:
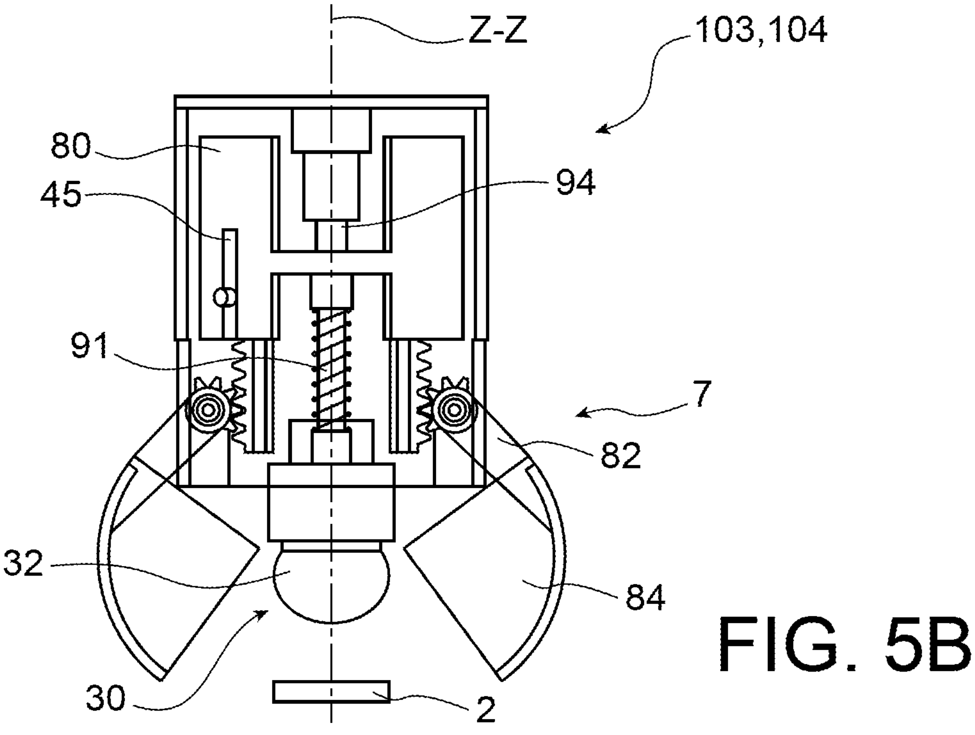

With reference to FIG. 5B, the recovery method 100 continues with a step of opening 103 the buckets 84 and extending the capture head 30 facing the radioactive material 2, when the linear actuator 90 biases the movement of the movable body 80 along the direction of actuation Z-Z. Opening the buckets 84, extending the capture head 30 in the direction of actuation Z-Z and moving the pin 47 along the groove 45, are progressive as the movable body 80 moves along the direction of actuation Z-Z relative to the chassis 70 and the arms 82 pivot relative to the chassis 70 to move the buckets 84 apart.

Extending the capture head along the direction of actuation Z-Z is accompanied with a step of inflating 104 the capture head 30. The inflator 96 fills the cushion 32 of the capture head with air, to increase pressure inside the cushion 32.

Figure 5C:
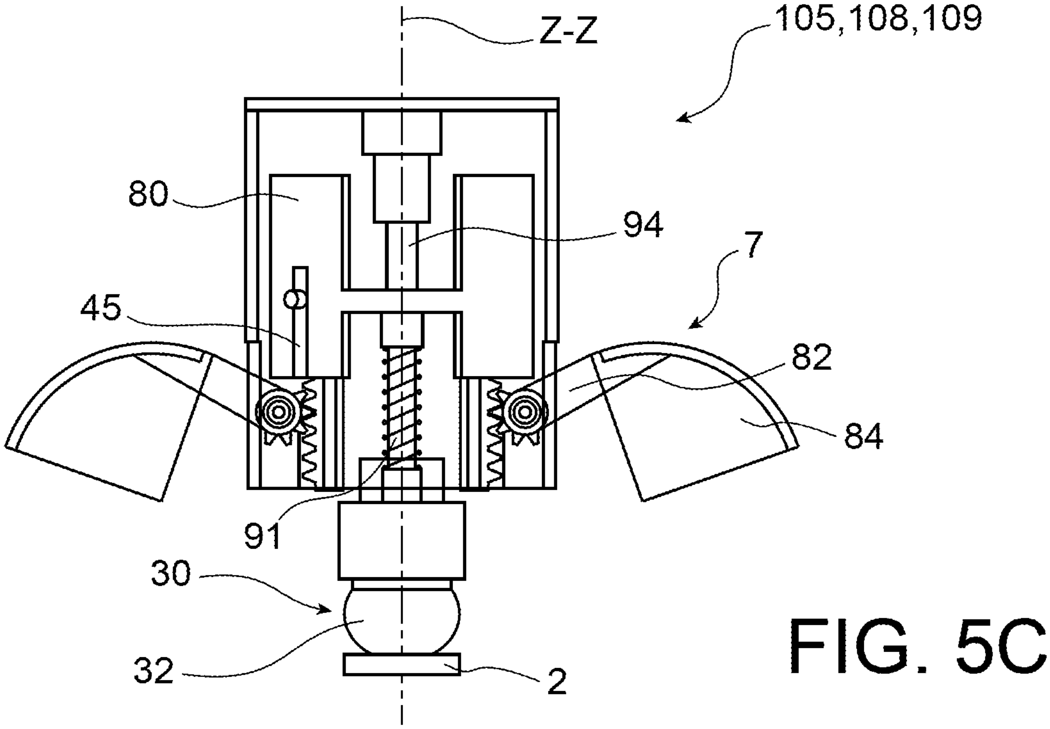

With reference to FIG. 5C, the recovery method 100 comprises a step of bringing the capture head 30 closer to the radioactive material 2 along the direction of actuation Z-Z, until the capture head 30 is pressed against the radioactive material 2 in step 108, thereby facilitating capture.

Pressing the capture head 30 onto the radioactive material 2 is accompanied with a step of depressurising 109 the capture head 30. The inflator 96 empties the cushion 32 of the capture head of air, to decrease pressure inside the cushion 32 and to at least partially suck in the radioactive material 2, to more easily capture and retain the radioactive material 2.

Figure 5D:
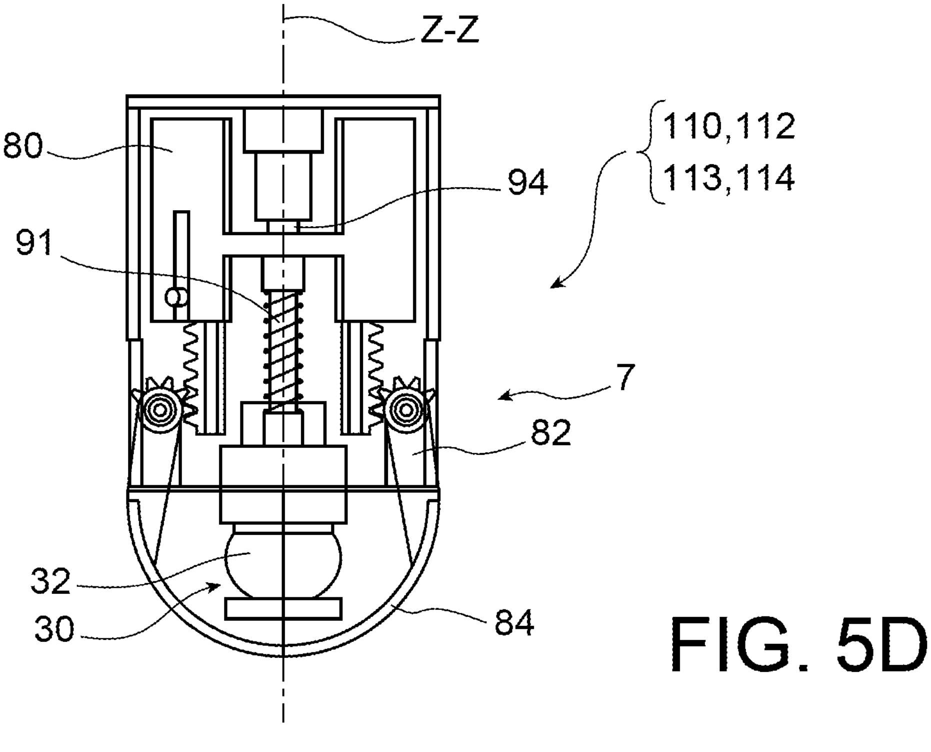

With reference to FIG. 5D, the recovery method 100 comprises a step of closing 110 each bucket 84 and retracting the capture head 30 towards the enclosure 75. Step 110 is a step comprising capturing the radioactive material 2 that remains fastened to the capture head 30. The recovery method 100 comprises a step of retaining 112 the radioactive material 2 inside the enclosure 75 which is then closed by the buckets 84, including when the radioactive material 2 possibly falls from the capture head 30 onto at least one of the buckets 84.

If necessary, the recovery method 100 comprises a verification step 113 in which it is verified that the radioactive material 2 is suitably retained inside the enclosure 75, for example via the monitoring device 10 or by shaking the recovery tool 7 and checking that the buckets 84 remain closed. The verification step 113 is to prevent the radioactive material 2 from being accidentally released, which could present a risk to human operators.

The recovery method 100 ends with a step of moving 114 the recovery tool 7 and transporting the radioactive material 2 to a container (not shown) in which the radioactive material 2 is radiologically isolated.

By virtue of the recovery tool 7, it is possible to capture the radioactive material 2, retain the radioactive material 2 inside the recovery tool 7, while protecting an operator from radiation. The recovery tool 7 is relatively not heavy and of low overall size. It is decontaminatable, reliable and easy to use. It can be remotely controlled, for example by remote operation, via the linear actuator 90 and the inflator 96.

The inflatable capture head 30 and the depression created in the capture head 30 allow the radioactive material 2 to be captured more effectively. The retracted position is a safety position of the capture head 30 towards which it tends in the absence of control of the recovery tool 7, thereby better retaining the radioactive material 2 inside the enclosure 75 in the event of incidents.

By being removable from the chassis 70, the capture head 30 can be easily replaced. The recovery tool 7 may be equipped with interchangeable capture heads 30, in particular a capture head 30 particularly adapted to each radioactive material 2 to be captured.

Of course, various modifications may be made by the person skilled in the art to the invention just described without departing from the scope of the disclosure of the invention.

Alternatively, the fluid is a liquid, for example water. The fluid may also be a gas other than air, for example an inert gas.

Alternatively, the holding member of the recovery tool 7 comprises, for example, a pole instead of the articulated arm 40.

Alternatively, the recovery tool 7 is of single use and is to capture at most one radioactive material 2.

The structure of the recovery tool 7 may vary, in particular that of the chassis 70 and the movable assembly 8. Generally, the shape of the movable body 80 is adapted to that of the chassis 70 to be movable relative to the chassis 70.

Alternatively, the movable body 80 may be movable relative to the chassis 70 with a rotational component in addition to the translational component along the direction of actuation Z-Z.

The structure of the drive device 20 may vary. The drive device 20 may comprise as many toothed wheels 24 and racks 22 as there are legs 85 of the movable body 80. Further alternatively, at least one of the arms 82 comprises the at least one rack 22 and at least one of the toothed wheels is rigidly integral with one of the legs 85 of the movable body 80.

Alternatively, the recovery tool 7 is free of guide device 44 of the movable body 80.

The structure of the guide device 44 may vary. For example, the number of grooves 45 and pins 47 of the guide device 44 is variable. The guide device 44 may comprise as many grooves 45 as there are buckets 84. In general, the guide device 44 comprises as many pins 47 as grooves 45. Further alternatively, the casing 71 comprises at least one groove 45 and each pin 47 is rigidly integral with the movable body 80.

Alternatively, the arms 82 are mechanically connected to the chassis rather than to the movable body 80. Each of the arms 82 is then configured to pivot by mechanical engagement of the chassis 70 between the opening position and the closing position of each bucket 84.

The structure of the buckets 84 may vary. In particular, they may be of different shapes from each other, especially of complementary shapes to close the enclosure 75 when in the closing position.

The number of buckets 84 of the recovery tool 7 is variable, for example the recovery tool 7 may comprise a single bucket 84 or at least three buckets 84.

Alternatively, at least one of the buckets 84 may be movable relative to the chassis 70 with a translational component in addition to the rotational component relative to the chassis 70.

The structure of the linear actuator 90 may vary. For example, the linear actuator 90 may comprise a spring, a hydraulic actuator and/or an electrical actuator.

The structure of the elastic return member 91 may vary. Alternatively, the elastic return member 91 comprises a leaf spring or a block of elastically deformable material such as an elastomer.

Alternatively, the enclosure 75 is delimited by the chassis 70, especially by the casing 71. In this case, the capture head 30 is entirely housed in the chassis 70 when it is in the retracted position.

Alternatively, the recovery tool 7 is free of inflator 96, especially when the capture head 30 is not supplied with fluid.

The structure of the capture head 30 may vary: for example, the capture head 30 comprises a suction nozzle instead of the cushion 32.

Alternatively, the capture head 30 is removably connected to the chassis 70 by other types of fasteners such as dowels. Further alternatively, the capture head 30 is non-removably connected to the chassis 70, for example by crimping.

Alternatively, the recovery monitoring device 10 comprises an image capture device which is located outwardly of the recovery tool 7, for example attached outwardly of the chassis 70.

The order of the steps of the recovery method 100 may vary. In particular, the step of opening 103 the buckets may take place before the recovery tool 7 faces the radioactive material 2. The capture head 30 may be at least partially inflated prior to the step of opening 103 the buckets.

The recovery method 100 may be free of step of pressing 108 the capture head 30, especially when the depression created in the capture head 30 at the depressurisation step 109 is sufficient to capture the radioactive material 2.

The step 113 of verifying retention of the radioactive material may be omitted, especially when the recovery tool 7 has already recovered a similar radioactive material 2.

The invention claimed is:

1. A recovery tool for recovering a solid element which is a radioactive material, comprising:

a chassis;

a capture head which is movable relative to the chassis between a retracted position and an extended position, wherein the capture head is housed inside an enclosure of the recovery tool in the retracted position, and wherein in the extended position, the capture head is for capturing the solid element;

at least one bucket which is movable relative to the chassis between an opening position and a closing position, wherein the capture head is in an extended position when the bucket is in the opening position, wherein the bucket is in an opening position when the capture head is in the extended position; and an elastic return member which is configured to elastically bias the capture head towards the retracted position, wherein the elastic return member comprises a tensions spring, wherein the capture head is in the retracted position to retain the solid element inside the enclosure when the bucket is in the closing position, wherein the bucket is in the closing position when the capture head is in the retracted position, and wherein the capture head comprises a cushion which is inflatable by a fluid, wherein the capture head is configured to retain the solid member relative to the chassis at least partially by suction by at least partially emptying the cushion of fluid.

2. The recovery tool according to the claim 1, wherein the movable bucket is a first bucket, and wherein the recovery tool comprises a second bucket movable between an opening position and a closing position, wherein the opening position is for extending the capture head, and wherein the capture head is in a retracted position to retain the solid element inside the enclosure when the second bucket is in the closing position.

3. The recovery tool according to claim 1, wherein each bucket is configured to remain in the closing position when the solid element impacts this bucket when the capture head is in the retracted position.

4. The recovery tool according to claim 1, in which each bucket is rotatably movable relative to the chassis between its opening position and its closing position.

5. The recovery tool according to claim 1, wherein each bucket is rigidly integral with an arm which is movably connected to a movable body of the recovery tool.

6. The recovery tool according to claim 1, wherein the chassis comprises a casing, wherein the recovery tool comprises a movable body which is distinct from the capture head and which is translationally movable relative to the chassis.

7. The recovery tool according to claim 6, wherein each bucket is rigidly integral with an arm which is movably connected to a movable body of the recovery tool, wherein the movable body comprises a mount and at least two legs each projecting from the mount, and wherein each leg is configured to mechanically engage an arm of a bucket to move this bucket relative to the chassis.

8. The recovery tool according to claim 1, comprising a guide device for guiding the movable body relative to the chassis, wherein the guide device comprises a groove which is configured to mechanically engage a pin which is housed in the groove.

9. The recovery tool according to claim 1, further comprising a linear actuator to move linearly the capture head relative to the chassis between the retracted position and the extended position, wherein the linear actuator comprises a cylinder.

10. The recovery tool according to claim 1, further comprising an inflator comprising a pump, wherein the inflator is fluidly connected to the capture head for inflating it by at least partially filling it with fluid and/or for deflating it by at least partially emptying it of fluid.

11. The recovery tool according to claim 1, wherein the cushion is made of a material comprising an elastomer.

12. The recovery tool according to claim 1, wherein the capture head is removably connected with respect to the chassis.

13. A recovery apparatus for recovering a solid element, which is a radioactive material, further comprising a recovery tool according to claim 1, wherein the recovery apparatus further comprises a control system for controlling the recovery tool and/or a holding member for holding the recovery tool.

14. The recovery apparatus according to claim 13, further comprising a recovery monitoring device for monitoring the recovery of the solid element by the recovery tool, wherein the recovery monitoring device comprises an image capture device.

15. A method for recovering a solid element, which is a radioactive material, by a recovery tool comprising:

a chassis;

a capture head which is movable relative to the chassis between a retracted position and an extended position, wherein the capture head is housed inside an enclosure of the recovery tool in the retracted position, and wherein in the extended position, the capture head is for capturing the solid element; and at least one bucket which is movable relative to the chassis between an opening position and a closing position, wherein the capture head is in an extended position when the bucket is in the opening position, wherein the bucket is in an opening position when the capture head is in the extended position, and wherein the capture head is in the retracted position to retain the solid element inside the enclosure when the bucket is in the closing position, wherein the bucket is in the closing position when the capture head is in the retracted position, and wherein the capture head comprises a cushion which is inflatable by a fluid, wherein the capture head is configured to retain the solid member relative to the chassis at least partially by suction by at least partially emptying the cushion of fluid, the method for recovering the solid element comprising:

a step of capturing the solid element, comprising depressurising the capture head to retain the solid element relative to the capture head, moving the capture head from its extended position to its retracted position, and closing the at least one bucket to retain the solid element inside the enclosure of the recovery tool.

16. The recovery method according to claim 15, comprising a step of opening the at least one bucket and extending the capture head, when the capture head faces the solid element, and inflating the capture head by filling it at least partially with fluid, before the step of capturing the solid element.

17. The recovery method according to claim 15, wherein the capture step comprises pressing the capture head onto the solid element, and depressurising the capture head by emptying it at least partially of fluid.

* * * * *